(12) United States Patent
Erickson et al.

(10) Patent No.: US 12,430,042 B2
(45) Date of Patent: Sep. 30, 2025

(54) MEMORY BUFFER DEVICES WITH MODAL ENCRYPTION

(71) Applicant: Rambus Inc., San Jose, CA (US)

(72) Inventors: Evan Lawrence Erickson, Chapel Hill, NC (US); Michael Alexander Hamburg, 's-Hertogenbosch (NL); Helena Handschuh, Miami, FL (US); Mark Evan Marson, Carlsbad, CA (US)

(73) Assignee: Rambus Inc., San Jose, CA (US)

( * ) Notice: Subject to any disclaimer, the term of this patent is extended or adjusted under 35 U.S.C. 154(b) by 126 days.

(21) Appl. No.: 18/494,641

(22) Filed: Oct. 25, 2023

(65) Prior Publication Data

US 2024/0143197 A1    May 2, 2024

Related U.S. Application Data

(60) Provisional application No. 63/421,504, filed on Nov. 1, 2022.

(51) Int. Cl.
    *G06F 3/00*             (2006.01)
    *G06F 3/06*             (2006.01)

(52) U.S. Cl.
    CPC .......... *G06F 3/0622* (2013.01); *G06F 3/0608* (2013.01); *G06F 3/064* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,735,673 B2 | 5/2004 | Kever | |
| 7,519,833 B2 | 4/2009 | Henry et al. | |
| 7,529,905 B2 | 5/2009 | Sinclair | |
| 9,152,554 B2 | 10/2015 | Uno | |
| 9,158,617 B2 | 10/2015 | Cho et al. | |
| 9,667,422 B1 | 5/2017 | Androulaki et al. | |
| 10,061,644 B2 | 8/2018 | Quach et al. | |
| 10,310,774 B2 | 6/2019 | Chhabra et al. | |
| 10,657,071 B2 | 5/2020 | Durham et al. | |
| 2001/0044805 A1* | 11/2001 | Multer | G06F 16/182 |
| 2017/0255402 A1* | 9/2017 | Narasimha | G06F 12/0246 |
| 2018/0040367 A1* | 2/2018 | Wu | G06F 3/0608 |

OTHER PUBLICATIONS

Taassori, Meysam et al., "VAULT: Reducing Paging Overheads in SGX with Efficient Integrity Verification Structures", ASPLOS '18, Session 7B: Memory 2, Mar. 24-28, 2018, Williamsburg, VA, USA, pp. 665-678. https://doi.org/10.1145/3296957.3177155. 14 pages.

\* cited by examiner

*Primary Examiner* — Midys Rojas
(74) *Attorney, Agent, or Firm* — Lowenstein Sandler LLP (57) ABSTRACT

Technologies for modal encryption are described. One memory buffer device includes a compression block and an in-line memory encryption (IME) block. The compression block can output compressed data. The IME block can encrypt uncompressed data at a first granularity and encrypt the compressed data at a second granularity, wherein the second granularity is larger than the first granularity.

20 Claims, 7 Drawing Sheets

MEMORY BUFFER DEVICES WITH MODAL ENCRYPTION

RELATED APPLICATIONS

This application claims the benefit of U.S. Provisional Application No. 63/421,504, filed Nov. 1, 2022, the entire contents of which are incorporated by reference.

BACKGROUND

Modern computer systems generally include one or more memory devices, such as those on a memory module. The memory module may include, for example, one or more random access memory (RAM) devices or dynamic random access memory (DRAM) devices. A memory device can include memory banks made up of memory cells that a memory controller or memory client accesses through a command interface and a data interface within the memory device. The memory module can include one or more volatile memory devices. The memory module can be a persistent memory module with one or more non-volatile memory (NVM) devices.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In general, error correction codes (ECCs) (also referred to as error correcting codes) can be used to detect and correct errors when transferring data, such as when reading from memory or sending over a communication channel. A first entity can encode a message with redundant information in the form of an ECC, where the redundancy allows a second entity to detect a first specified number of errors that can occur in the message and correct a second specified number of errors. The ECC information is usually added to stored data to enable recovery of corrupted data or data in transit to enable recovery of changed bits caused by the communication channel. The second specified number of errors that can be corrected is determined by a design and size of the ECC. A stronger ECC requires more redundancy, possibly reducing available bandwidth or effective bit rate. For example, a Reed-Solomon RS(40,32) code can provide the memory module with single-device data correction (SDDC) capability (e.g., Chipkill® technology) and detect and correct multi-bit errors within up to 4 (16-bit) symbols with an ECC error escape probability of $5e^{-15}$. ECC error escape probability is the probability that an error escapes ECC detection and correction.

The Compute Express Link (CXL®) protocol includes the ability to store additional bits of metadata at cache line granularity to be used, for example, by a central processing unit (CPU) to resolve memory coherency. Some CPUs can utilize additional metadata for other uses, such to provide memory security. If in-line memory encryption (IME) with cryptographic integrity is utilized, a message authentication code (MAC) can be stored as metadata and verified, often in parallel with decryption. A MAC is data or information used to cryptographically authenticate an origin of data being sent from one entity to another. A MAC, also known as a tag, can protect a message's data integrity (also known as authenticity), allowing an entity with a key to verify the authenticity of a message. Depending on the configuration of the memory system, a variety of ECC options would be appropriate, each with different ECC error escape probabilities (e.g., 4-symbols detect and 3-symbols correct with a lower ECC error escape probability or 3-symbol correct with a higher error escape probability). Depending on the CPU's metadata and security requirements, providing the SDDC capability (e.g., Chipkill® technology) may not be possible. For example, due to the limited space, if any metadata is used for a MAC or by the host (host-controlled metadata), then Chipkill® with 4-symbol correction either cannot be achieved or additional DRAM must be used to store the additional metadata.

Aspects of the present disclosure and embodiments address these problems and others by providing a device that uses compression logic and modal encryption. Aspects of the present disclosure and embodiments can include a memory buffer device supporting memory compression and memory encryption where non-compressed data is encrypted at a first granularity (cache line) while compressed memory is encrypted at a second granularity (multiple cache lines) where the second granularity is larger than the first granularity. In some embodiments, the memory buffer device supports the CXL® technology. In some embodiments, the memory buffer device creates, stores, and verifies a MAC at the granularity of compression. In other embodiments, the memory buffer device creates, stores, and verifies a MAC at the granularity of encryption. In some embodiments, the granularity of encryption and the length of a MAC are adjusted based on a device-private data structure (e.g., page table). In other embodiments, the granularity of encryption is determined by the device based on the address being accessed. In other embodiments, the memory buffer device is informed of the granularity of encryption by a connected host. In other embodiments, the encrypted data includes a MAC with a length that can vary based on the degree of compression. The length of the MAC for a region of memory can be stored in a device-private data structure. In some embodiments, additional data can be encrypted with the compressed data to obscure its length.

Aspects of the present disclosure and embodiments can reduce power and latency by matching the IME granularity to that of compression. Aspects of the present disclosure and embodiments can calculate a single MAC across the compressed data, rather than many cache line granularity MACs, which saves Advanced Encryption Standard (AES) calculation power while reducing both power and latency by eliminating the need to load/store in-line metadata from device memory. Aspects of the present disclosure and embodiments can be used with other encryption algorithms. Aspects of the present disclosure and embodiments can encrypt/decrypt compressed data to reduce the number of AES "tweaks" that need to be computed for a range of data to one per-compressed data block rather than one per-cache line, saving power. For example, some encryption modes, such as XTS and GCM, processing an encrypted block of data requires cipher operations proportional to the length of the data, plus a few more operations not depending on the length, to compute "tweak" values. Aspects of the present disclosure and embodiments can reduce the number of AES sub-blocks used during key expansion by using the same key across multiple consecutive cache lines. Aspects of the present disclosure and embodiments can use compression logic with dedicated IME logic to save power through other optimizations. For example, using fewer AES blocks by serializing their operation to save area and/or using slower AES blocks can save power by optimizing the IME logic to match the speed of compression/decompression. Aspects of the present disclosure and embodiments can use a lower-power encryption algorithm for compressed data blocks. Aspects of the present disclosure can optimize the implementation of the encryption algorithm and encryption mode used in yet other ways.

Aspects of the present disclosure and embodiments can improve reliability, availability, and serviceability (RAS) by allowing side-band metadata to be used to store ECC check symbols, rather than MAC data (which could be stored alongside the compressed data in memory). Aspects of the present disclosure and embodiments can increase security and RAS by allowing a significantly larger MAC than possible at cache line granularity. The MAC length could vary based on available space within a compression frame up to the algorithm limit. The IME granularity could be selected based on a compressed flag in a page table entry (PTE).

Aspects of the present disclosure and embodiments can use slots within a physical page to simplify management of the memory tracking and address translation. Since the compressed data is smaller than the uncompressed data, the compressed data can fit in fewer slots of a physical page. After compressed data is placed in a slot, the remaining space in the slot can be used for a MAC of the compressed data and/or ECC information. For example, when encrypting the compressed data at block granularity, a MAC for the block (e.g., multiple cache lines or a page) can be included after the compressed data in memory, rather than with each compressed cache line.

Aspects of the present disclosure and embodiments can increase security for compressed data. Using latency optimized compressed "slots" can increase the difficulty of an attack by allowing the data to only change at gross boundaries (e.g., 1 Kilobyte (KiB) to 2 KiB). An attacker would need to overcome the isolation of data from different virtual machines or hosts in order to inject data to be compressed with secret data and observe the size of the compressed data. As described herein, random data of random length can be appended to potentially change the compressed size as it crosses a slot boundary to obscure the length of compressed data. The random data could be appended to compressed data before encryption. The random data could be appended to the real data, compressed with the real data, and encrypted. The additional data length can be stored in the page tables, the compression header, or other data structures.

In at least one embodiment, the memory module can be a NVM module with secure backup capabilities that supports the CXL® technology. The memory module 108 can be a CXL® module. The NVM module can include a CXL® controller or a CXL® memory expansion device (e.g., CXL® memory expander System on Chip (SoC)) that is coupled to DRAM (e.g., one or more volatile memory devices) and persistent storage memory (e.g., one or more NVM devices). The CXL® memory expansion device can include a management processor. The CXL® memory expansion device can include an ECC circuit to detect and correct errors in data read from memory or transferred between entities. The CXL® memory expansion device can use an encryption circuit, such as an IME circuit, to encrypt the host's unencrypted data before storing it in the DRAM. The IME circuit can generate a MAC as described herein that can be used to detect and track errors caused by attacks.

Figure 1:
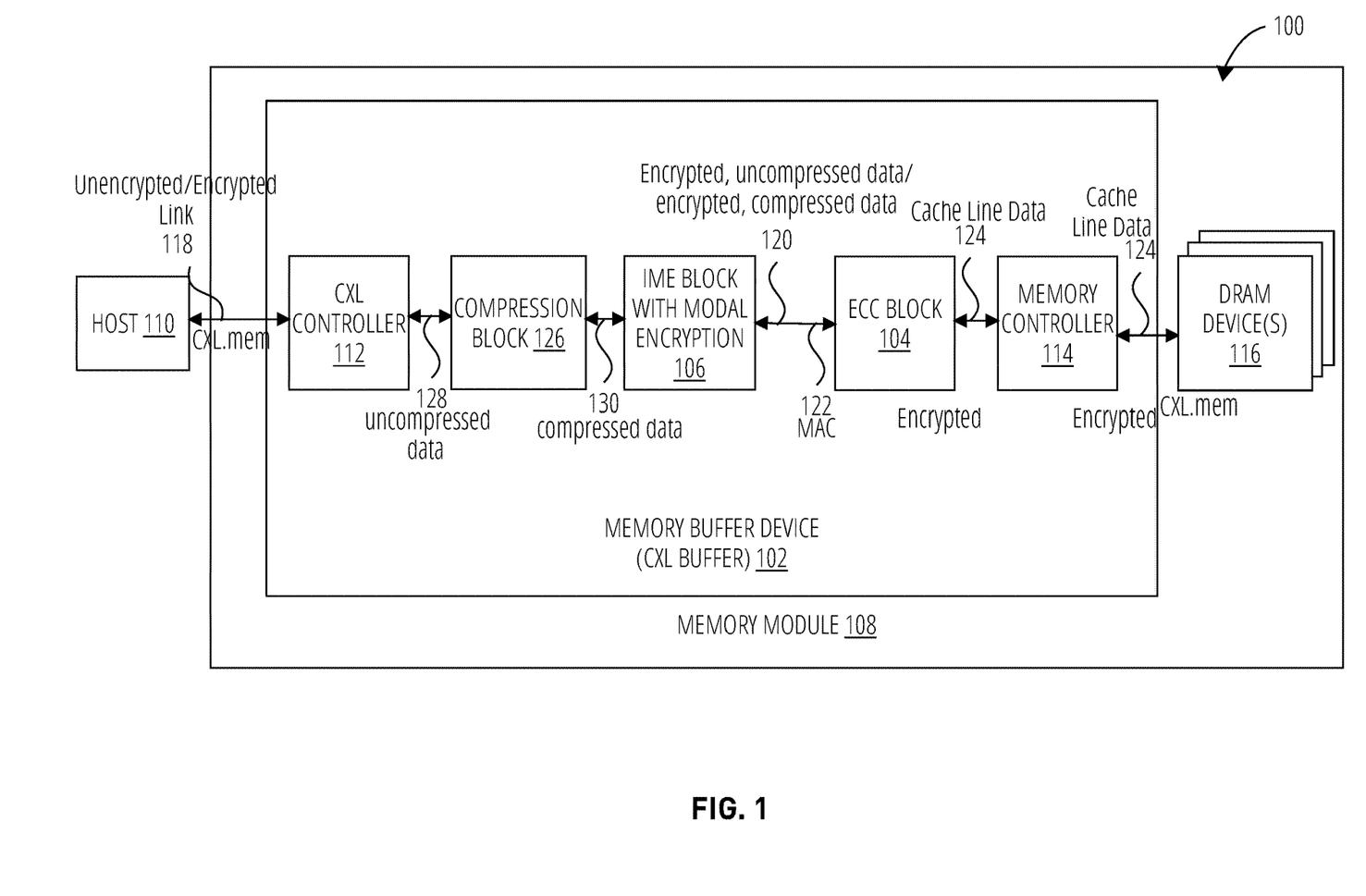
FIG. 1 is a block diagram of a memory system with a memory module 108 with a compression block 126 and an in-line memory encryption (IME) block with modal encryption according to at least one embodiment.

FIG. 1 is a block diagram of a memory system 100 with a memory module 108 with a compression block 126 and an IME block with modal encryption 106 according to at least one embodiment. In one embodiment, the memory module 108 includes a memory buffer device 102 and one or more DRAM device(s) 116. In one embodiment, the memory buffer device 102 is coupled to one or more DRAM device(s)s 116 and a host 110. In another embodiment, the memory buffer device 102 is coupled to a fabric manager that is operatively coupled to one or more hosts. In another embodiment, the memory buffer device 102 is coupled to both the host 110 and the fabric manager. A fabric manager is software executed by a device, such as a network device or switch that manages connections between multiple entities in a network fabric. The network fabric is a network topology in which components pass data to each other through interconnecting switches. A network fabric includes hubs, switches, adapter endpoints, etc., between devices.

In one embodiment, the memory buffer device 102 includes the compression block 126 coupled to the IME block with modal encryption 106. The compression block 126 can compress data and decompress data using a type of compression technique. In at least one embodiment, the compression block 126 uses the Lempel-Ziv-Welch (LZW) algorithm. The compression block 126 can compress the data at varying granularities of compression. In at least one embodiment, the IME block with modal encryption 106 can send or receive encrypted data that has a MAC with a length that varies based on a degree of compression of the encrypted data.

In at least one embodiment, the compression block 126 can receive uncompressed data 128 from the host 110. In another embodiment, the compression block 126 can receive uncompressed data 128 (decrypted data) from the IME block with modal encryption 106. The compression block 126 can compress the uncompressed data 128 to obtain compressed data 130, which is output to the IME block with modal encryption 106. In some instances, the IME block with modal encryption 106 can receive the uncompressed data 128 from the host 110 without any compression by the compression block 126. In these instances, the IME block with modal encryption 106 can encrypt the uncompressed data 128 at a first granularity to obtain encrypted data 120. This encrypted data 120 is encrypted, uncompressed data. In other instances, the IME block with modal encryption 106 can receive the compressed data 130 from the compression block 126. The IME block with modal encryption 106 can encrypt the compressed data 130 at a second granularity to obtain encrypted data 120, where the second granularity is larger than the first granularity. This encrypted data 120 is encrypted, compressed data. The first granularity can be a single cache line or cache line granularity, and the second granularity can be multiple cache lines, page granularity, or the like. In other embodiments, a first unit size other than a cache line can be used for uncompressed data at the first granularity, and a second unit size greater than the first unit size can be used for the compressed data at the second granularity. In some instances, uncompressed data is stored in the DRAM device(s) 116 and retrieved by the memory buffer device 102 to compress the uncompressed data into compressed data 130 by the compression block 126 and encrypted into encrypted, compressed data by the IME block with modal encryption 106 before being stored back in the DRAM device(s) 116.

In at least one embodiment, the IME block with modal encryption 106 can generate a MAC 122 for each cache line to provide cryptographic integrity on accesses to the respective cache line of the encrypted, uncompressed data (120) in some instances. In other instances, the IME block with modal encryption 106 can generate a single MAC 122 for the encrypted, compressed data (120), which can include a set of cache lines, as well as metadata associated with the set of cache lines. In at least one embodiment, the IME block with modal encryption 106 can generate the MAC 122 at a granularity of compression. In at least one embodiment, the IME block with modal encryption 106 can generate the MAC 122 at a granularity of encryption. In at least one embodiment, the granularity of encryption and a length of the MAC 122 can be adjusted based on a device-private data structure (not illustrated in FIG. 1). The device-private data structure can be a page table or other types of tables used by the memory buffer device 102. In at least one embodiment, the IME block with modal encryption 106 can determine the granularity of encryption based on an address being accessed. In at least one embodiment, the IME block with modal encryption 106 can receive an indication of the granularity of encryption from the host 110.

In at least one embodiment, the IME block with modal encryption 106 can verify one or more MACs associated with the encrypted, uncompressed data stored in DRAM device(s) 116. The one or more MACs were previously generated at the first granularity. The IME block with modal encryption 106 can decrypt the encrypted, uncompressed data to obtain decrypted data. The compression block 126 can generate the compressed data 130 using the decrypted data. The IME block with modal encryption 106 can encrypt the compressed data 130 to obtain encrypted, compressed data. The IME block with modal encryption 106 can generate a MAC for the encrypted, compressed data at the second granularity. In at least one embodiment, the IME block with modal encryption 106 can send or receive encrypted data that has a MAC with a length that varies based on a degree of compression of the encrypted data. In at least one embodiment, the length of the MAC for a region of memory is stored in a device-private data structure.

In at least one embodiment, the IME block with modal encryption 106 can encrypt the compressed data with additional data to obscure a length of the compressed data. To obscure the length of compressed data, random data of random length can be appended to potentially change the compressed size as it crosses a slot boundary. In at least one embodiment, the random data could be appended or prepended to compressed data before encryption. In at least one embodiment, the random data could be appended or prepended to the real data, compressed with the real data, and encrypted. An indication of the additional data length would be stored in either the page tables or the compression header.

In one embodiment, the memory buffer device 102 includes an error correction code (ECC) block 104 (e.g., ECC circuit) to detect and correct errors in cache lines or sets of cache lines being read from a DRAM device(s) 116. In at least one embodiment, ECC block 104 can generate and verify first ECC information to be stored with each cache line of the uncompressed data and generate and verify second ECC information to be stored with a set of cache lines of the compressed data. The ECC block 104 can detect and correct an error in a cache line of the uncompressed data using the first ECC information. The ECC block 104 can detect and correct an error in the set of cache lines of the compressed data using the second ECC information. In another embodiment, the ECC block 104 can use one ECC mode if the data is compressed and a different ECC mode if uncompressed. The ECC block 104 can add ECC information to uncompressed data, compress it, and then add more ECC, as well.

The memory buffer device may also include a CXL® controller coupled to the compression block and one or more hosts, and a memory controller coupled to the ECC block and the DRAM device. Other technical features may be readily apparent to one skilled in the art from the following figures, descriptions, and claims.

In a further embodiment, the memory buffer device 102 includes a CXL® controller 112 and a memory controller 114. The CXL® controller 112 is coupled to host 110 and the compression block 126. The memory controller 114 is coupled to the one or more DRAM devices 116. In a further embodiment, the memory buffer device 102 includes a management processor and a root of trust (not illustrated in FIG. 1). In at least one embodiment, the management processor can receive one or more management commands through a command interface between the host 110 (or fabric manager) and the management processor. In at least one embodiment, the memory buffer device 102 is implemented in a memory expansion device, such as a CXL® memory expander SoC of a CXL® NVM module or a CXL® module. The memory buffer device 102 can encrypt unencrypted data (e.g., plain text or cleartext user data), received from a host 110, using the IME block with modal encryption 106 to obtain encrypted data 120 before storing the encrypted data 120 in DRAM device(s) 116.

In some cases, the IME block with modal encryption 106 can receive data that is encrypted for transmission across the link. The IME block with modal encryption 106 can generate a MAC 122 associated with the encrypted data 120. In at least one embodiment, the IME block with modal encryption 106 is an IME engine. In another embodiment, the IME block with modal encryption 106 is an encryption circuit or encryption logic. The ECC block 104 can receive the encrypted data 120 from the IME block with modal encryption 106. The ECC block 104 can generate ECC information associated with the encrypted data 120. The encrypted data 120, the MAC 122, and the ECC information can be organized as cache line data 124. The memory controller 114 can receive the cache line data 124 from the ECC block 104 and store the cache line data 124 in the DRAM device(s) 116.

It should be noted that the memory buffer device 102 can receive unencrypted data, but can also receive data that is encrypted as it traverses a link (e.g., the CXL® link). This encryption is usually a link encryption, generally referred to in CXL® as integrity and data encryption. The link encryption, in this case, would not persist to DRAM as the CXL® controller 112 in the memory module 108 can decrypt the link data and verify its integrity before the flow described herein where the IME block with modal encryption 106 encrypts the data and generates the MAC 122. Although "unencrypted data" is used herein, in other embodiments, the data can be encrypted data that is encrypted by the memory buffer device 102 using a key only used for the link, and thus cleartext data exists within the SoC after the CXL® controller 112 and thus needs to be encrypted by the IME block with modal encryption 106 to provide encryption for data at rest. In other embodiments, the IME block with modal encryption 106 does not encrypt the data but still generates the MAC 122.

In at least one embodiment, the CXL® controller 112 includes two interfaces, a host memory interface (e.g., CXL.mem) and a management interface (e.g., CLX.io). The host memory interface can receive, from the host 110, one or more memory access commands of a remote memory protocol, such as the CXL® protocol, Gen-Z, Open Memory Interface (OMI), Open Coherent Accelerator Processor Interface (OpenCAPI), or the like. The management interface can receive, from the host 110 or the fabric manager by way of the management processor, one or more management commands of the remote memory protocol.

In at least one embodiment, the IME block with modal encryption 106 receives a data stream from a host 110 and encrypts the data stream into the encrypted data 120, and provides the encrypted data 120 to the ECC block 104 and the memory controller 114. The memory controller 114 stores the encrypted data in the DRAM device(s) 116 along with the MAC 122 and the ECC information as the cache line data 124. This cache line data 124 can be accessed as individual cache lines. At some point, the memory buffer device 102 can determine that the encrypted data stored in DRAM device(s) 116 should be compressed. This can be done to save space in DRAM device(s) 116, for example. The memory buffer device 102 can retrieve the encrypted data. The IME block with modal encryption 106 can verify the one or more MACs associated with the encrypted data being retrieved. The IME block with modal encryption 106 can decrypt the encrypted data to obtain uncompressed data for the compression block 126. The compression block 126 can compress the uncompressed data to obtain compressed data 130. The IME block with modal encryption 106 can encrypt the compressed data 130 to obtain the encrypted, compressed data 120. The IME block with modal encryption 106 can generate the MAC 122 for the compressed data. The ECC block 104 can generate ECC information. The encrypted data 120, the MAC 122, and the ECC information can be organized as cache line data 124. The memory controller 114 can receive the cache line data 124 from the ECC block 104 and store the cache line data 124 in the DRAM device(s) 116. This cache line data 124 can be accessed as a set of multiple cache lines.

In some embodiments, the memory module 108 has persistent memory backup capabilities where the management processor can access the encrypted data 120 and transfer the encrypted data from the DRAM device(s) 116 to persistent memory (not illustrated in FIG. 1) in the event of a power-down event or a power-loss event. The encrypted data 120 in the persistent memory is considered data at rest. In at least one embodiment, the management processor transfers the encrypted data to the persistent memory using an NVM controller (e.g., NAND controller).

The IME block with modal encryption 106 can include multiple encryption functions, such as a first encryption function that uses 128-bit AES encryption and a second encryption function that uses 256-bit AES encryption. In other embodiments, the encryption functions can also provide cryptographic integrity, such as using a MAC. In other embodiments, the cryptographic integrity can be provided separately from the encryption function. In some cases, the strength of the MAC and encryption algorithms can differ. The first encryption function can have a first encryption strength, such as AES-256 encryption. In at least one embodiment, the IME block with modal encryption 106 is an IME engine with two encryption functions. In another embodiment, the IME block with modal encryption 106 includes two separate IME engines, each having one of the two encryption functions. In another embodiment, the IME block with modal encryption 106 includes a first encryption circuit for the first encryption function and a second encryption circuit for the second encryption function. Alternatively, additional encryption functions can be implemented in the IME block with modal encryption 106. The memory controller 114 can receive the encrypted data 120 from the IME block with modal encryption 106 and store the encrypted data 120 in the DRAM device(s) 116 from the IME block with modal encryption 106.

In at least one embodiment, the MAC can be calculated on a first encrypted data stored with a second encrypted data as part of the algorithm (e.g., AES) or separately with a different algorithm. The memory controller 114 can receive the encrypted data 120 and MAC 122 from the IME block with modal encryption 106 and store the encrypted data 120 and MAC 122 in the DRAM device(s) 116. The host-to-unencrypted memory path can bypass the IME block with modal encryption 106 for all host transactions. The host-to-unencrypted memory path can still pass through the IME block with modal encryption 106 for generating the MAC 122. The host-to-memory path can bypass the compression block 126 for some or all host transactions.

In at least one embodiment, the MAC 122 can be stored and transferred as metadata in connection with cache line data. The metadata can have a first portion with ECC information and a second portion with the MAC 122. In at least one embodiment, when the memory compression is enabled, the cache line data and any metadata could be compressed together before encryption. This can free up space for the ECC information (e.g., 4-symbol correction) and larger MACs, such as 128 bits. The space freed up by compression can be utilized to store larger MACs that are 64 bits or more. In some cases, the MACs are greater than 16 bits. In other embodiments, smaller MACs can still be used, such as 28-bit MACs or smaller. The number of bits of the metadata can vary between the ECC information and the MAC 122. In another embodiment, the metadata can include only the MAC 122. The metadata can be stored and transferred in side-band metadata or in-band metadata, as illustrated and described below with respect to FIG. 2.

Figure 2:
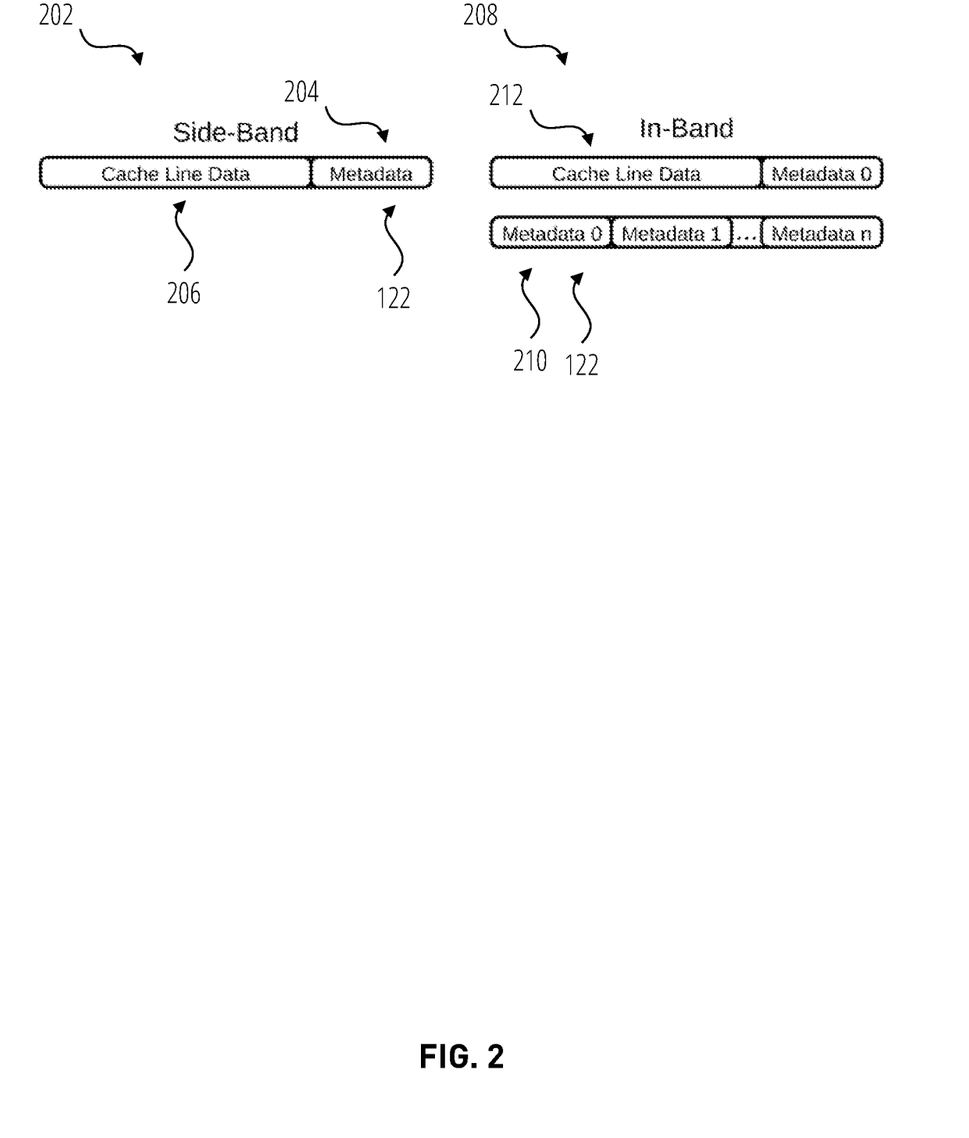
FIG. 2 illustrates a cache line in which a message authentication code (MAC) is stored and transferred in side-band metadata associated with cache line data and a cache line in which a MAC is stored and transferred in in-band metadata associated with cache line data, according to various embodiments.

FIG. 2 illustrates a cache line 202 in which a MAC 122 is stored and transferred in side-band metadata 204 associated with cache line data 206 and a cache line 208 in which a MAC 122 is stored and transferred as in-band metadata 210 associated with cache line data 212, according to various embodiments. In general, the metadata includes ECC symbols and the MAC 122. The metadata can be stored as side-band metadata 204 or in-band metadata 210. The side-band metadata 204 can be accessible when the cache line 202 is read from memory. The in-band metadata 210 can be stored in a location other than the cache line data 212, such as in a static RAM (SRAM) or DRAM, stored in one or more additional cache lines. When the cache line 208 is read, an additional memory read would be performed to retrieve the in-band metadata 210, including the MAC 122. The metadata can also store counters, such as counters used to prevent replay attacks, as well as counters associated with the number of MAC verification failures.

As described herein, the cache line data 212 and metadata can be retrieved from DRAM device(s). The metadata can include host-controlled metadata (e.g., non-ECC and non-MAC metadata), device-private metadata, ECC information, and a MAC. The host-controlled metadata, device-private metadata, and the cache line data 212 can be compressed together before re-encryption. New ECC information and MAC can then be computed on the compressed data, which already includes the host-controlled and device-private metadata. The new ECC information and MAC can be stored as side-band metadata 204 or in-band metadata 210. The host-controlled and device-private metadata is stored in the cache line data 206 or cache line data 212.

Figure 3:
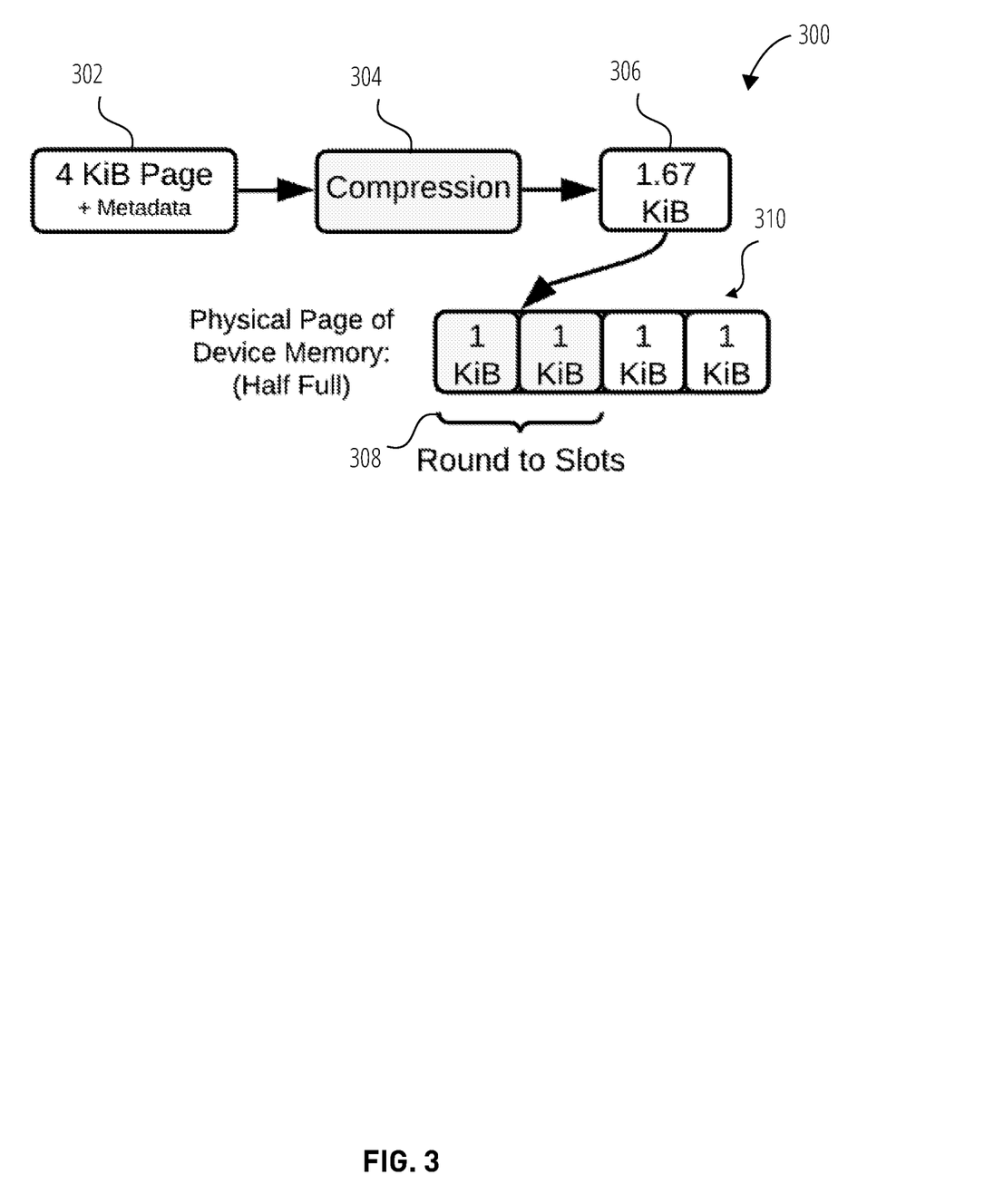
FIG. 3 is a flow diagram illustrating a compression flow according to at least one embodiment.

FIG. 3 is a flow diagram illustrating a compression flow 300 according to at least one embodiment. The compression flow 300 can be performed by compression block 126 of FIG. 1. In the compression flow 300, the compression logic 304 receives uncompressed data and metadata 302 for one physical page, such as a 4 Kilobyte (KiB) page. The compression logic 304 can compress the uncompressed data and metadata 302 into compressed data 306 before encryption. In this example, the compression occurs before encryption since encrypted data is inherently random and can reduce the ability of the compression logic 304 to find similar patterns in a page of memory, which reduces the compression ratio. In this example, the compression logic 304 compresses the 4 KiB page data and metadata into 1.67 KiB for the compressed data 306. In this example, the compressed data 306 would only fill up less than half of the physical page of device memory. It should be noted that compressing data at a block granularity larger than a cache line (e.g., a page) requires a block to be decompressed on access, and therefore allows encryption to occur at the same granularity.

In at least one embodiment, the memory buffer device can use slots within a physical page to simplify management of the memory tracking and address translation. Since the compressed data 306 is 1.67 KiB, the compressed data 306 can fit in two of the four 1 KiB slots in a 4 KiB physical page. The remaining space in the second slot and/or the space in the remaining two slots can be used for a MAC of the compressed data 306 and/or ECC information. For example, when encrypting the compressed data 306 at block granularity, a MAC for the block (e.g., multiple cache lines or a page) can be included after the compressed data 306 in memory, rather than with each compressed cache line, as illustrated in an encryption flow of FIG. 4. Using latency optimized compressed "slots" would increase the difficulty of an attack by allowing the data to only change at gross boundaries (e.g., 1 KiB to 2 KiB). An attacker would need to overcome the isolation of data from different virtual machines or hosts in order to inject data to be compressed with secret data and observe the size of the compressed data. As described herein, random data of random length can be appended or prepended to potentially change the compressed size as it crosses a slot boundary to obscure the length of compressed data. The random data could be appended or prepended to compressed data before encryption. The random data could be appended or prepended to the real data, compressed with the real data, and encrypted. The additional data length can be stored in the page tables, the compression header, or other data structures.

In at least one embodiment, a memory block of the block granularity is a physical page and includes a first number of slots. The compressed data can be stored in a second number of slots less than the first number of slots. The encryption circuit can generate a MAC for the compressed data to be stored after the compressed data in the memory block. The MAC can be 64 bits or greater. In other embodiments, the MAC can be greater than 16 bits.

Figure 4:
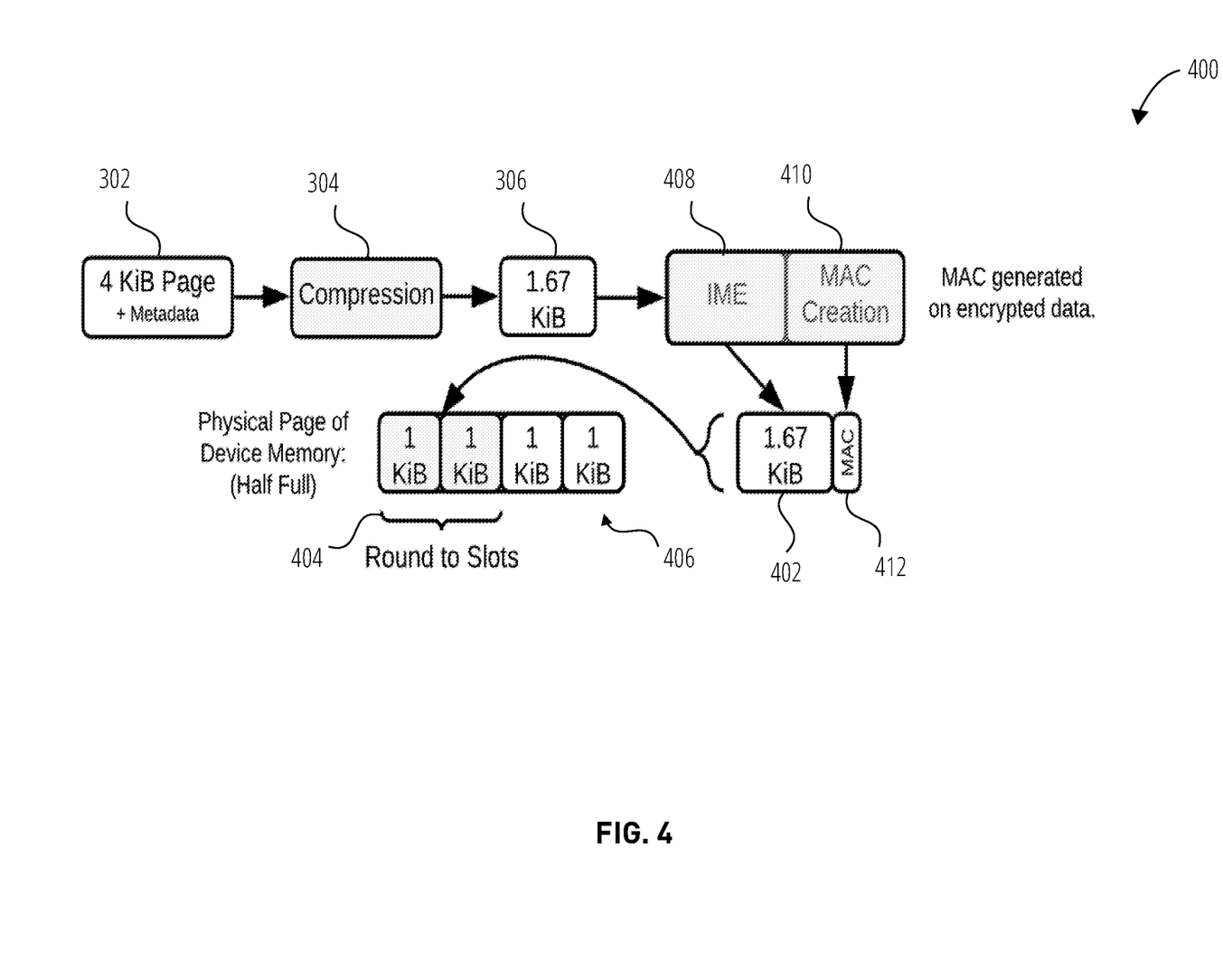
FIG. 4 is a flow diagram of an encryption flow according to at least one embodiment.

FIG. 4 is a flow diagram of an encryption flow 400 according to at least one embodiment. The encryption flow 400 can be performed by encryption logic 408 and MAC generation logic 410, which can be part of an IME block or an encryption circuit. In the encryption flow 400, encryption logic 408 can receive compressed data 306, compressed by the compression logic 304 in the compression flow 300. As described above, when encrypting the compressed data 306 at block granularity, a MAC 412 can be generated by the MAC generation logic 410 and included after the compressed data 306 in memory, rather than with each compressed cache line as in FIG. 3. This allows a larger MAC to be used, and the larger MAC can be saved as metadata with the compressed data. For example, a full 128-bit MAC can be stored as metadata, instead of a truncated MAC. The MAC 412 can still be truncated and may still be larger than MACs that are limited in metadata space. Since the host-controlled metadata is compressed with the page data in the compressed data 306 and the MAC 412 is saved at block granularity, no additional cache line metadata is required for either. Therefore, the compressed data 306 can utilize a larger MAC than possible with cache line encryption while allowing an ECC block (not illustrated in FIG. 4) to use all the cache line metadata to provide error detection and correction, such as four symbols used for the SDDC capability (e.g., Chipkill® technology).

In at least one embodiment, the memory buffer device can use slots within a physical page to simplify management of the memory tracking and address translation. Since the compressed data 306 is less than the original size of the memory block 406 (e.g., 1.67 KiB), the compressed data 306 can fit in fewer slots 404 (e.g., 2 slots) of the memory block 406 (e.g., four 1 KiB-slots in a 4 KiB physical page). The remaining space in the second slot and/or the space in the remaining two slots can be used for the MAC 412 and/or ECC information.

In at least one embodiment, the memory buffer device can encrypt data at a block granularity rather than on a per-cache line basis. In at least one embodiment, the IME block can calculate the encrypted text for the compressed data as a single unit, rather than calculated individually for each cache line. In at least one embodiment, the compression block can output compressed data and the IME block can encrypt the compressed data at a granularity greater than a per-cache line basis. In this embodiment, the encryption is done after compression at the greater granularity than cache-line granularity. In a further embodiment, the IME block can calculate some encrypted text for uncompressed data on a cache-line basis and encrypt some text for compressed data as a single unit that is greater than the cache-line basis.

Figure 5:
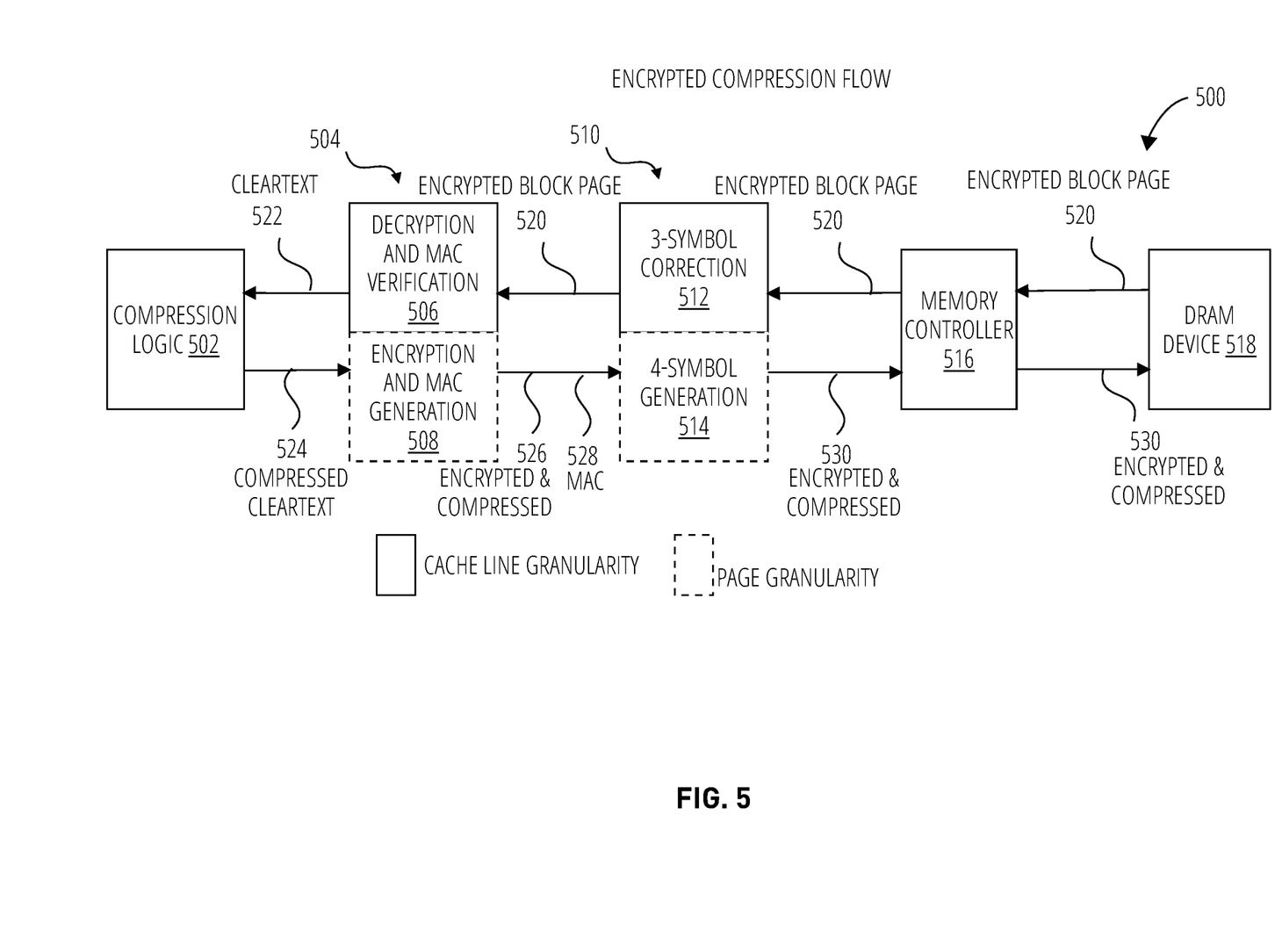
FIG. 5 is a flow diagram of an encrypted compression flow according to at least one embodiment.

FIG. 5 is a flow diagram of an encrypted compression flow 500 according to at least one embodiment. In the encrypted compression flow 500, an encrypted block page 520 comprising 64 cache lines of data in an uncompressed state, is migrated to an encrypted and compressed state. The memory controller 516 retrieves the encrypted block page 520 from DRAM device 518 and sends the encrypted block page 520 to the ECC logic 510. The memory controller 516 can read all 64 cache lines from DRAM device 518. The ECC logic 510 can perform error detection and correction operations, such as a 3-symbol correction 512 on each cache line of the encrypted block page 520. In this example, 4-symbol correction is not used since the MAC and host-controlled metadata are stored in lieu of additional ECC check symbols. The ECC logic 510 sends the encrypted block page 520 to the IME logic 504 to perform decryption and MAC verification 506 on each of the cache lines to obtain cleartext 522. The IME logic 504 can decrypt all 64 cache lines and verify the saved MACs corresponding to the cache lines. The IME logic 504 sends the cleartext 522 to the compression logic 502. The cleartext 522 can include host-controlled metadata.

The compression logic 502 can compress the cleartext 522 (and the host-controlled metadata) into compressed cleartext 524. The compression logic 502 can send the compressed cleartext 524 to the IME logic 504 to perform encryption and MAC generation 508 to obtain encrypted and encrypted and compressed data 526 and a MAC 528. The IME logic 504 can perform encryption and MAC generation at a page granularity (or remain at a cache line granularity in other embodiments). The MAC 528 for the encrypted and compressed data 526 can be re-calculated at the granularity of compression of the compressed cleartext 524. The IME logic 504 sends the encrypted and compressed data 526, and MAC 528 to the ECC logic 510 which can perform error detection and correction operations, such as a 4-symbol generation 514 on the set of caches lines of the encrypted and compressed data 526. The 510 can send encrypted and compressed data 530 to the memory controller 516. The encrypted and compressed data 530 can include MAC 528 and ECC information generated by 4-symbol generation 514. The memory controller 516 can send the encrypted and compressed data 530 to DRAM device 518. The encrypted and compressed data 530 corresponds to the encrypted block page 520, but the encrypted and compressed data 530 is in an encrypted and compressed state.

It should be noted that the ECC capabilities, the MAC sizes, and storage requirements may vary between the two modes (modal encryption) in which data is either in an encrypted and uncompressed state or an encrypted and compressed state. In at least one embodiment, the uncompressed data may use fewer ECC symbols (e.g., 3-symbol correction 512), a smaller MAC, and/or additional in-band metadata, as compared to the compressed data. The compressed data may use more ECC symbols (e.g., 4-symbol generation 514), a larger MAC, and/or a different in-band metadata configuration compared to the uncompressed data. For example, the compressed data allows for both full SDDC capability (e.g., Chipkill® ECC) and a larger MAC without additional memory. In at least one embodiment, a page table or register data allows the correct ECC mode and MAC length to be determined for accessing the data.

In at least one embodiment, matching the IME granularity to that of compression can reduce power and latency. Calculating a single MAC across the compressed data, rather than many cache line granularity MACs, can save AES calculation power while reducing both power and latency by eliminating the need to load/store in-line metadata from device memory. Encrypting/decrypting compressed data can reduce the number of AES "tweaks" in AES-XTS mode that need to be computed for a range of data to one per-compressed data block rather than one per-cache line, saving power. Additional optimizations are possible when using the same key across multiple consecutive cache lines, such as reducing the number of AES sub-blocks that must be computed during key expansion. Compression logic using dedicated IME logic could also save power through optimization. For example, fewer AES blocks can be used by serializing their operation to save area. Slower AES blocks can be used to save power by optimizing the IME logic to match the speed of compression/decompression. Alternatively, a lower-power encryption algorithm could be used for compressed data blocks. The compression logic can improve reliability, availability, and serviceability (RAS) by allowing side-band metadata to be used to store ECC check symbols, rather than MAC data (which could be stored alongside the compressed data in memory). The compression logic can increase security and RAS by allowing a significantly larger MAC than possible at cache line granularity. The MAC length could vary based on available space within a compression frame up to the algorithm limit. The IME granularity could be selected based on a compressed flag in a page table entry (PTE).

Figure 6:
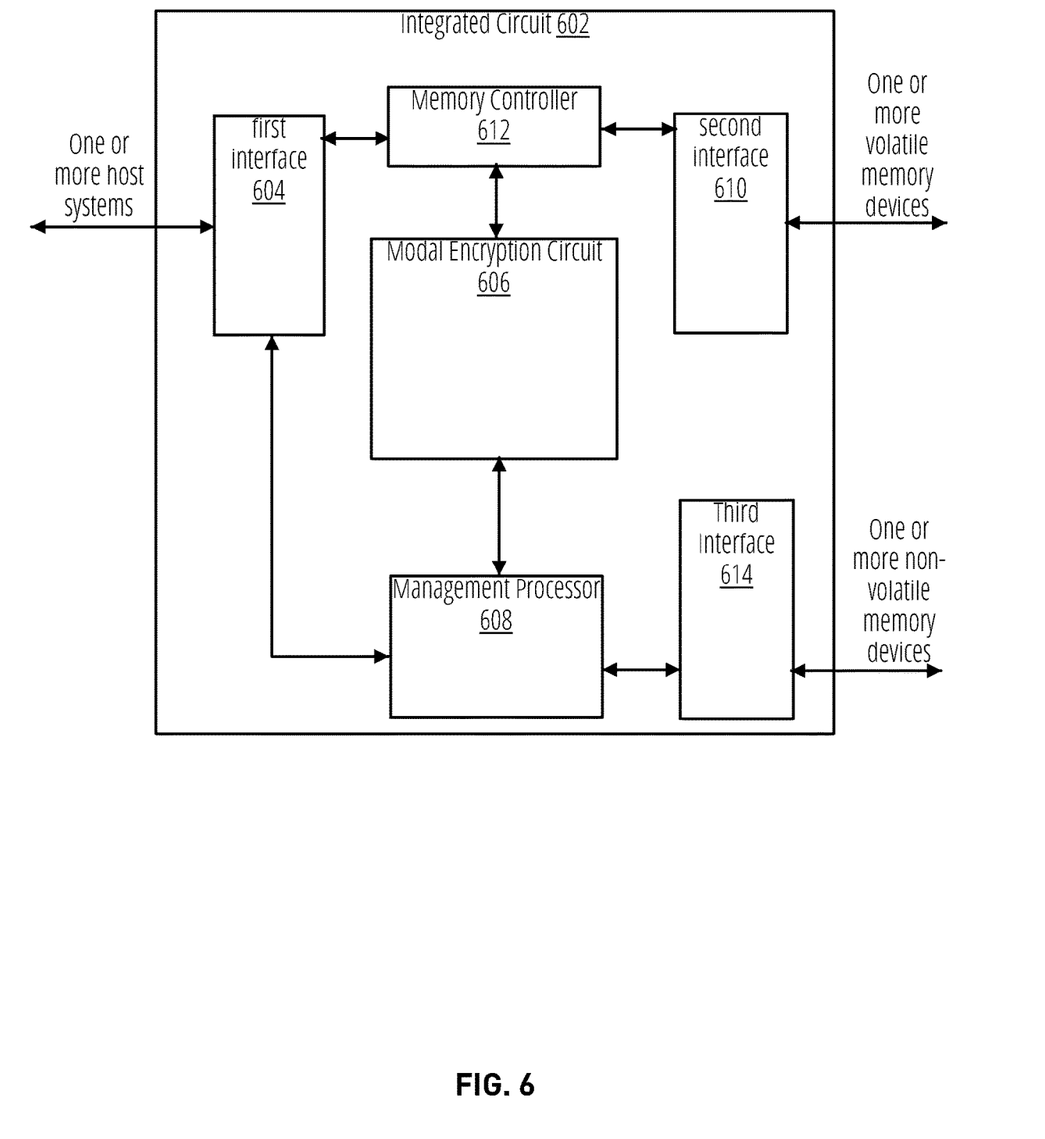
FIG. 6 is a block diagram of an integrated circuit with a memory controller, an encryption circuit, and a management processor according to at least one embodiment.

FIG. 6 is a block diagram of an integrated circuit 602 with a memory controller 612, a modal encryption circuit 606, and a management processor 608 according to at least one embodiment. In at least one embodiment, the integrated circuit 602 is a controller device that can communicate with one or more host systems (not illustrated in FIG. 6) using a cache-coherent interconnect protocol (e.g., the Compute Express Link (CXL®) protocol). The integrated circuit 602 can be a device that implements the CXL® standard. The CXL® protocol can be built upon physical and electrical interfaces of a PCI Express® standard with protocols that establish coherency, simplify the software stack, and maintain compatibility with existing standards. The integrated circuit 602 includes a first interface 604 coupled to the one or more host systems or a fabric manager, a second interface 610 coupled to one or more volatile memory devices (not illustrated in FIG. 6), and may include a third interface 614 coupled to one or more non-volatile memory devices (not illustrated in FIG. 6). The one or more volatile memory devices can be DRAM devices. The integrated circuit 602 can be part of a single-host memory expansion integrated circuit, a multi-host memory pooling integrated circuit coupled to multiple host systems over multiple cache-coherent interconnects, or the like.

In one embodiment, the memory controller 612 receives data from a host over the first interface 604 or from a volatile memory device over the second interface 610. The memory controller 612 can send the data or a copy of the data to the modal encryption circuit 606. The modal encryption circuit 606 can include a compression circuit, compression logic, or a compression block to compress the data. In some cases, the data is not compressed (uncompressed data). The modal encryption circuit 606 can compress the data based on a mode of the modal encryption circuit 606. The mode of the modal encryption circuit 606 can be stored in register data. In another embodiment, a page table can specify whether the data is or should be compressed. The modal encryption circuit 606 can include an encryption circuit, encryption logic, an IME block, an IME engine, IME logic, or an encryption block to encrypt data. Based on a mode, the modal encryption circuit 606 can encrypt uncompressed data at a first granularity and encrypt compressed data at a second granularity. The modal encryption circuit 606 can include MAC circuitry to generate, verify and store MACs at different granularities, as described herein. In at least one embodiment, the modal encryption circuit 606 includes an ECC block or circuit, as described herein. The ECC block can generate ECC information at different sizes as well.

In another embodiment, the one or more non-volatile memory devices are coupled to a second memory controller of the integrated circuit 602. In another embodiment, the integrated circuit 602 is a processor that implements the CXL® standard and includes the modal encryption circuit 606 and memory controller 612. In another embodiment, the integrated circuit 602 can include more or fewer interfaces than three.

Figure 7:
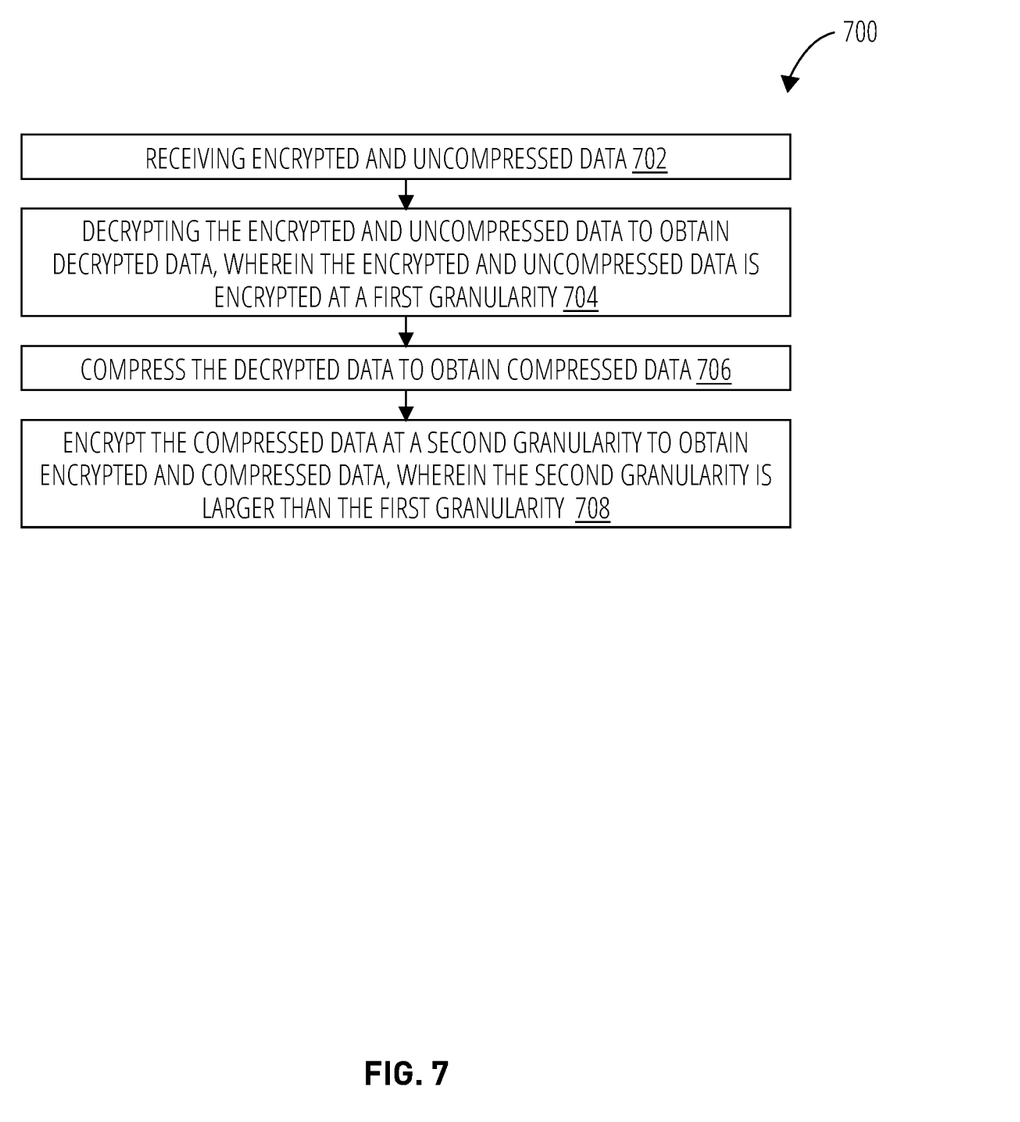
FIG. 7 is a flow diagram of a method for modal encryption according to at least one embodiment.

FIG. 7 is a flow diagram of a method 700 for modal encryption according to at least one embodiment. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by the memory buffer device 102 of FIG. 1. In another embodiment, the method 700 is performed by a memory expansion device. In another embodiment, the method 700 is performed by the memory module 108 of FIG. 1. In another embodiment, the method 700 is performed by an integrated circuit 602 of FIG. 6, having the modal encryption circuit 606. Alternatively, other devices can perform the method 700.

Referring to FIG. 7, the method 700 begins with the processing logic receiving encrypted and uncompressed data (block 702). At block 704, the processing logic decrypts the encrypted and uncompressed data to obtain decrypted data. The encrypted and uncompressed data is encrypted at a first granularity. At block 706, the processing logic compresses the decrypted data to obtain compressed data. At block 708, the processing logic encrypts the compressed data at a second granularity to obtain encrypted and compressed data. The second granularity is larger than the first granularity. In at least one embodiment, the first granularity is a single cache line, and the second granularity is multiple cache lines. In another embodiment, the processing logic generates a MAC corresponding to at least one of a granularity of compression or a granularity of encryption. In another embodiment, the processing logic generates ECC information corresponding to the encrypted and compressed data. The ECC information can be stored with a set of multiple cache lines of the encrypted and compressed data.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access

What is claimed is:

1. A memory buffer device comprising:
   a compression block to output compressed data; and
   an in-line memory encryption (IME) block coupled to the compression block, wherein the IME block is to encrypt uncompressed data at a first granularity and encrypt the compressed data at a second granularity, wherein the second granularity is larger than the first granularity.

2. The memory buffer device of claim 1, wherein the first granularity is a single cache line, and wherein the second granularity is multiple cache lines.

3. The memory buffer device of claim 1, wherein the IME block is to generate a message authentication code (MAC) at a granularity of compression.

4. The memory buffer device of claim 1, wherein the IME block is to generate a message authentication code (MAC) at a granularity of encryption.

5. The memory buffer device of claim 4, wherein the granularity of encryption and a length of the MAC are adjusted based on a device-private data structure.

6. The memory buffer device of claim 5, wherein the device-private data structure is a page table.

7. The memory buffer device of claim 4, wherein the IME block is to determine the granularity of encryption based on an address being accessed.

8. The memory buffer device of claim 4, wherein the IME block is to receive an indication of the granularity of encryption from a host coupled to the memory buffer device.

9. The memory buffer device of claim 1, wherein the IME block is to:
   verify one or more message authentication codes (MACs) associated with the uncompressed data, the one or more MACs being generated at the first granularity; and
   generate a MAC for the compressed data at the second granularity.

10. The memory buffer device of claim 9, wherein:
    the IME block is to decrypt the uncompressed data into decrypted data; and
    the compression block is to generate the compressed data using the decrypted data.

11. The memory buffer device of claim 1, wherein the IME block is to send or receive encrypted data, wherein the encrypted data comprises a message authentication code (MAC) with a length that varies based on a degree of compression of the encrypted data.

12. The memory buffer device of claim 11, wherein the length of the MAC for a region of memory is stored in a device-private data structure.

13. The memory buffer device of claim 1, wherein the IME block is to encrypt the compressed data with additional data to obscure a length of the compressed data.

14. The memory buffer device of claim 1, further comprising:
    a CXL controller coupled to the compression block and one or more hosts;
    an error correction code (ECC) block to detect and correct errors in cache lines being read from a dynamic random access memory (DRAM) device; and
    a memory controller coupled to the ECC block and the DRAM device.

15. A memory module that supports a remote memory protocol, the memory module comprising:
    one or more volatile memory devices;
    a compression circuit to output compressed data; and
    an encryption circuit coupled to the compression circuit, wherein the encryption circuit is to encrypt uncompressed data at a first granularity and encrypt the compressed data at a second granularity, wherein the second granularity is larger than the first granularity.

16. The memory module of claim 15, further comprising:
    an error correction code (ECC) circuit coupled to the encryption circuit, wherein the ECC circuit is to generate and verify first ECC information to be stored with each cache line of the uncompressed data and generate and verify second ECC information to be stored with a set of cache lines of the compressed data.

17. The memory module of claim 16, wherein the encryption circuit is to:
    generate a first message authentication code (MAC) to be stored with each cache line of the uncompressed data and verify the respective first MAC when accessing the respective cache line; and
    generate a second MAC to be stored with the set of cache lines of the compressed data and verify the second MAC when accessing the set of cache lines.

18. A method comprising:
    receiving encrypted and uncompressed data;
    decrypting the encrypted and uncompressed data to obtain decrypted data, wherein the encrypted and uncompressed data is encrypted at a first granularity;
    compressing the decrypted data to obtain compressed data; and
    encrypting the compressed data at a second granularity to obtain encrypted and compressed data, wherein the second granularity is larger than the first granularity.

19. The method of claim 18, wherein the first granularity is a single cache line, and wherein the second granularity is multiple cache lines.

20. The method of claim 19, further comprising:
    generating a message authentication code (MAC) corresponding to at least one of a granularity of compression or a granularity of encryption; and
    generating error correction code (ECC) information corresponding to the encrypted and compressed data, wherein the ECC information is to be stored with a set of multiple cache lines of the encrypted and compressed data.

* * * * *